United States Patent
Sasaoka

[11] Patent Number: 6,009,059
[45] Date of Patent: Dec. 28, 1999

[54] METHOD FOR GENERATING A WOBBLE SIGNAL IN A CD-R DRIVE

[75] Inventor: Takayuki Sasaoka, Kanagawa, Japan

[73] Assignee: Mitsumi Electric Co., Ltd., Tokyo, Japan

[21] Appl. No.: 08/917,418

[22] Filed: Aug. 26, 1997

[30] Foreign Application Priority Data

Aug. 27, 1996 [JP] Japan ..................................... 8-225503

[51] Int. Cl.$^6$ ....................................................... G11B 7/00
[52] U.S. Cl. ........................ 369/54; 369/44.13; 369/44.41
[58] Field of Search ............................. 369/44.41, 44.42, 369/44.35, 44.36, 44.13, 54, 32, 48

[56] References Cited

U.S. PATENT DOCUMENTS

| | | | |
|---|---|---|---|
| 4,985,616 | 1/1991 | Nakamura et al. . | |
| 5,023,856 | 6/1991 | Raaymakers et al. | 369/44.13 |
| 5,031,166 | 7/1991 | Getreuer et al. | 369/44.13 |
| 5,377,178 | 12/1994 | Saito et al. | 369/124 |
| 5,383,169 | 1/1995 | Shinoda et al. | 369/44.13 |
| 5,459,706 | 10/1995 | Ogawa et al. | 369/44.13 |
| 5,508,991 | 4/1996 | Onigata et al. | 369/44.13 |
| 5,537,373 | 7/1996 | Horikiri | 369/44.13 |
| 5,682,365 | 10/1997 | Carasso et al. | 369/44.13 |
| 5,696,742 | 12/1997 | Ogata et al. | 369/44.13 |
| 5,696,752 | 12/1997 | Hajjar et al. | 369/44.13 |
| 5,742,578 | 4/1998 | Kumai et al. | 369/44.13 |
| 5,828,639 | 10/1998 | Kobayashi et al. | 369/275.3 |

FOREIGN PATENT DOCUMENTS

| | | |
|---|---|---|
| 0512625 | 11/1992 | European Pat. Off. . |
| 0623921 | 9/1994 | European Pat. Off. . |

*Primary Examiner*—Nabil Hindi
*Attorney, Agent, or Firm*—Whitham, Curtis & Whitham

[57] ABSTRACT

An output from a left half light-receiving portion C1, C4 of a main-beam photodiode 5 of an optical pickup and an output from a right half light-receiving portion C2, C3 of a main-beam photodiode 5 of an optical pickup are normalized, and the difference between the normalized outputs is calculated.

$$(C1+C4)/\alpha*(C1+C4)-(C2+C3)/\alpha*(C2+C3)$$

in which $\alpha$ is a constant.

Accordingly, even in the case where the objective lens 1 is shifted to the inside or outside of a track, a wobble signal can be extracted securely because the DC offset components of the difference signals in the on-track main laser beam MB are cancelled out.

1 Claim, 5 Drawing Sheets

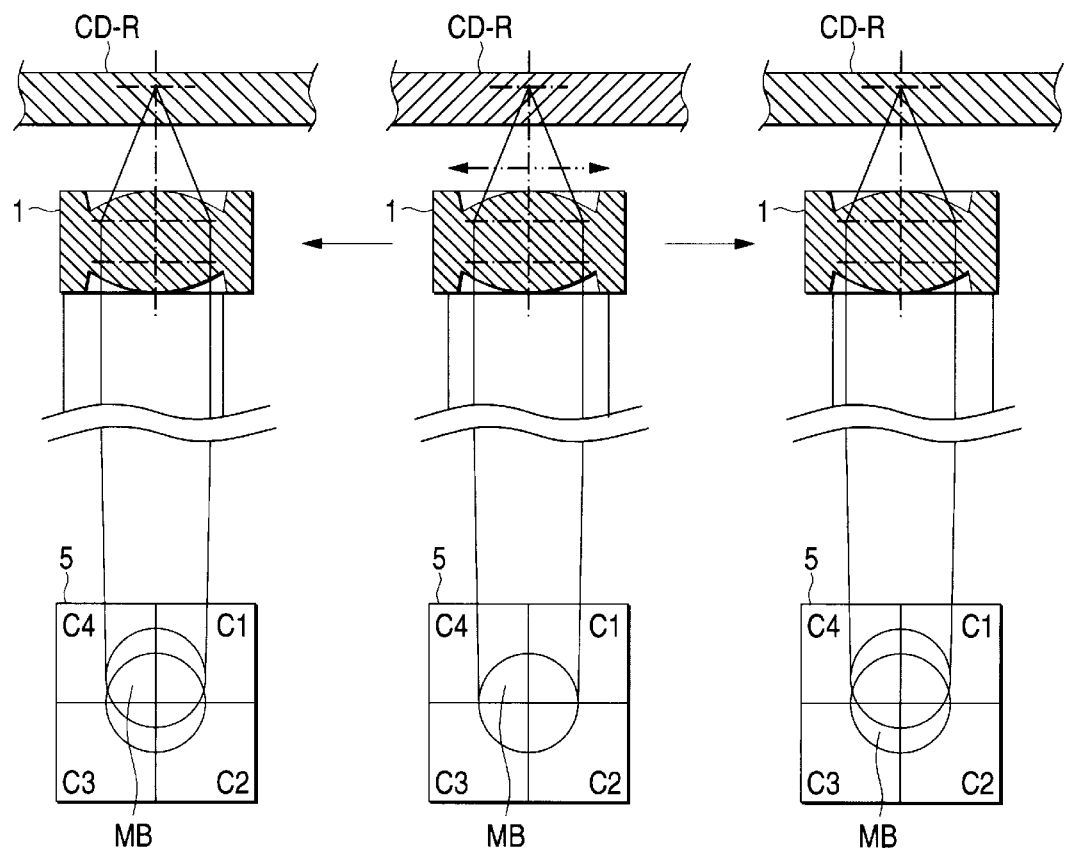

METHOD FOR GENERATING A WOBBLE SIGNAL IN A CD-R DRIVE

BACKGROUND OF THE INVENTION

1. Field of the Invention

The present invention relates to a method for generating a wobble signal in a CD-R drive and particularly to a method for generating a wobble signal in a CD-R drive in which the influence of the displacement of a main axis of an objective lens of an optical pickup is eliminated.

2. Related Art

A conventional method for generating a wobble signal in a CD-R drive will be described below with reference to FIGS. 3 through 5. As shown in FIG. 3, wobble pits WP displaced left and right from the center of a track are dug in a surface of a CD-R disk so that disk rotation speed control and data write timing control are carried out on the basis of information which is obtained when a three-spot type optical pickup emits a main laser beam MB and sub laser beams SB in the left and right of the main laser beam MB and the main laser beam MB passes through a wobble pit WP.

FIG. 4(a) shows a light-receiving system of an optical pickup in a CD-R drive. The reference numeral 1 designates an objective lens; 2, a polarizing beam splitter; 3, a condensing lens; and 4, a photosensor. As shown in FIG. 4(b), a main-beam photodiode 5 is disposed in the center of the photosensor 4. As shown in FIG. 5, there is extracted a wobble signal which is a push-pull signal of an output from an inner light-receiving portion C1, C4 (upper in the drawing) of the main-beam photodiode 5 and an output from an outer light-receiving portion C2, C3 (lower in the drawing) of the main-beam photodiode 5.

wobble signal=(C1+C4)−(C2+C3)

When the objective lens 1 is shifted to the inner or outer side of the disk by an objective lens actuator, however, the main axis of the objective lens 1 is displaced left or right (upper or lower in the drawing) from the center position of the main-beam photodiode 5 shown in FIG. 5(b). Accordingly, the balance between the output from the inner light-receiving portion C1, C4 and the output from the outer light-receiving portion C2, C3 is lost as shown in FIG. 5(a) or 5(c). As a result, a DC offset occurs in the push-pull signal so that it may be difficult to extract the wobble signal.

There arises a technical problem to be solved so that the wobble signal can be extracted securely regardless of the relative positional deviations of the objective lens and the photosensor to thereby improve stability.

SUMMARY OF THE INVENTION

The present invention makes a proposal to achieve the foregoing object and provides a method for generating a wobble signal in a CD-R drive which receives reflected light of wobble pits dug in a CD-R disk by means of a main-beam photodiode of an optical pickup, and carries out an operation for calculating a difference between an output from an inner half light-receiving surface of the main-beam photodiode and an output from an outer half light-receiving surface of the main-beam photodiode to thereby extract a wobble signal, characterized by the steps of: normalizing the respective outputs from the inner half and outer half light-receiving surfaces of the main-beam photodiode; and subtracting one of the respective outputs from the other output to thereby extract a wobble signal.

BRIEF DESCRIPTION OF THE DRAWINGS

FIGS. 5(a), 5(b) and 5(c) show a light-receiving surface of a main-beam photodiode. FIG. 5(a) is a front view showing a state in which the objective lens is shifted inward; FIG. 5(b) is a front view showing a state in which the objective lens is not shifted; and FIG. 5(c) is a front view showing a state in which the objective lens is shifted outward.

DETAILED DESCRIPTION OF THE PREFERRED EMBODIMENTS

Figure 1:
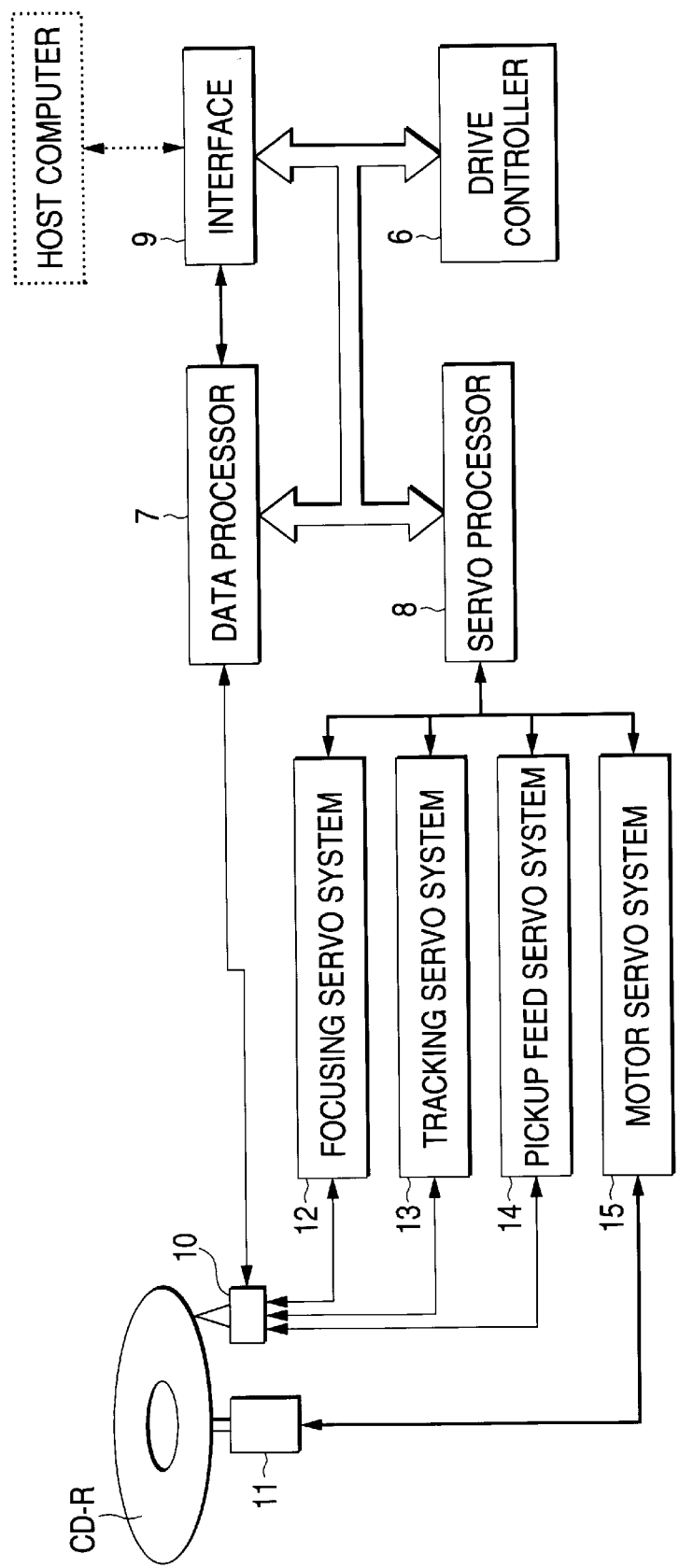
FIG. 1 is a basic configuration diagram of a drive.

A mode for carrying out the present invention will be described below. FIG. 1 shows a basic configuration of a CD-R drive which comprises a drive controller 6, a data processor 7, a servo processor 8, an interface 9, a laser pickup 10, and a spindle motor 11. The drive controller 6 controls the data processor 7, the servo processor 8 and the interface 9. The servo processor 8 controls a focusing servo system 12, a tracking servo system 13, a pickup feed servo system 14 and a motor servo system 15.

Figure 2:
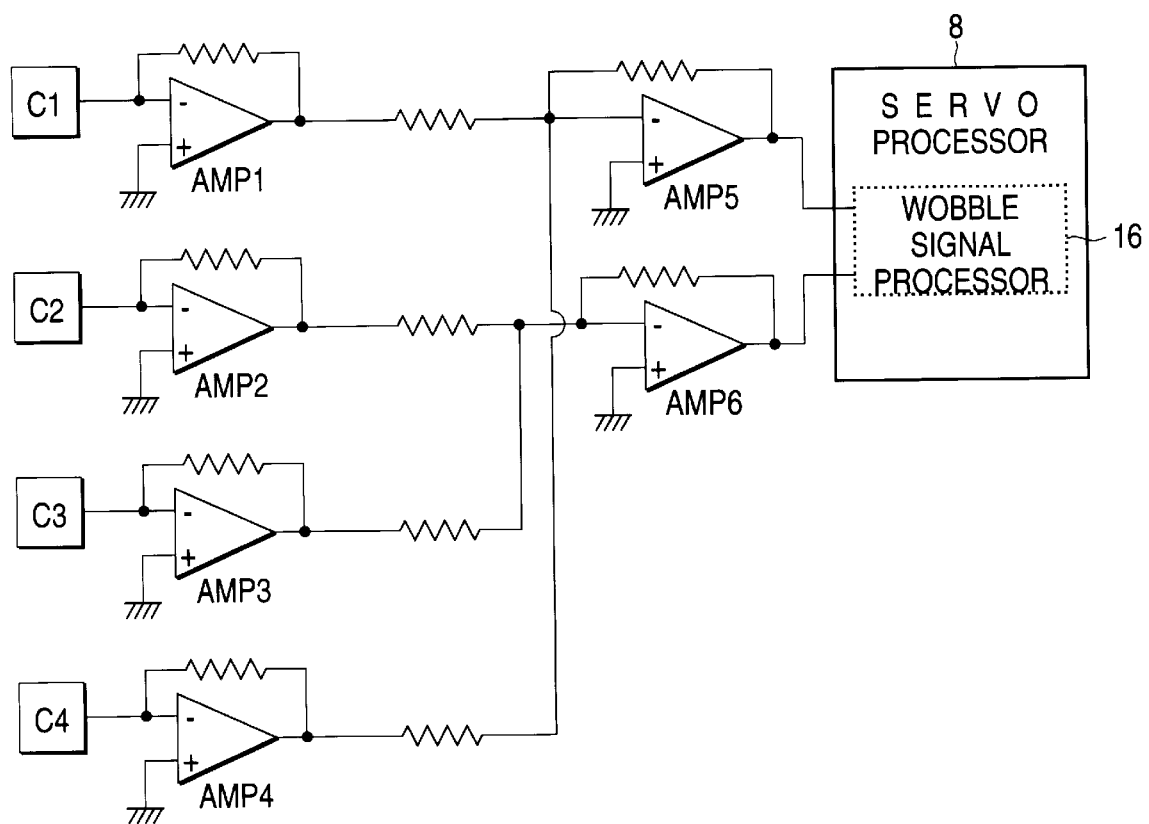
FIG. 2 is a block diagram of a wobble signal extraction system.
Figure 3:
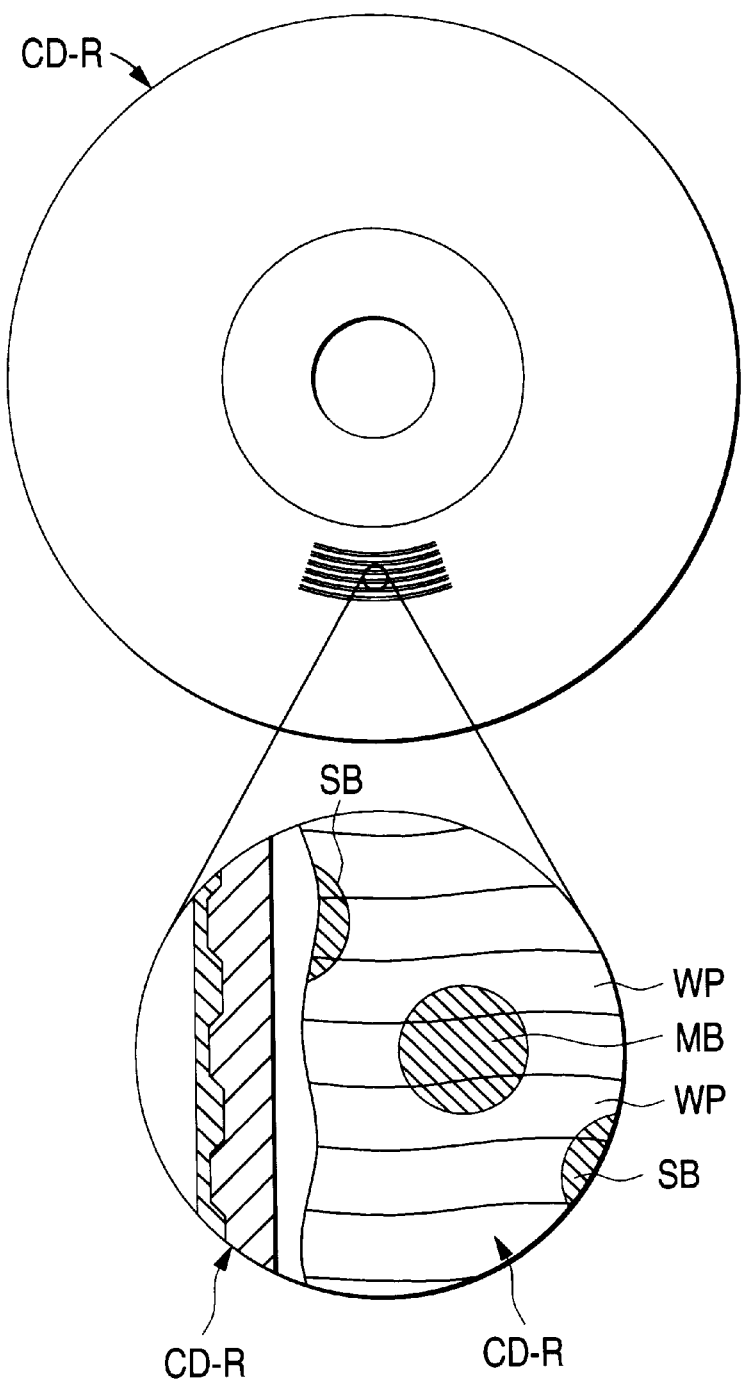
FIG. 3 is an enlarged view of a recording surface of the CD-R disk.
Figure 4:
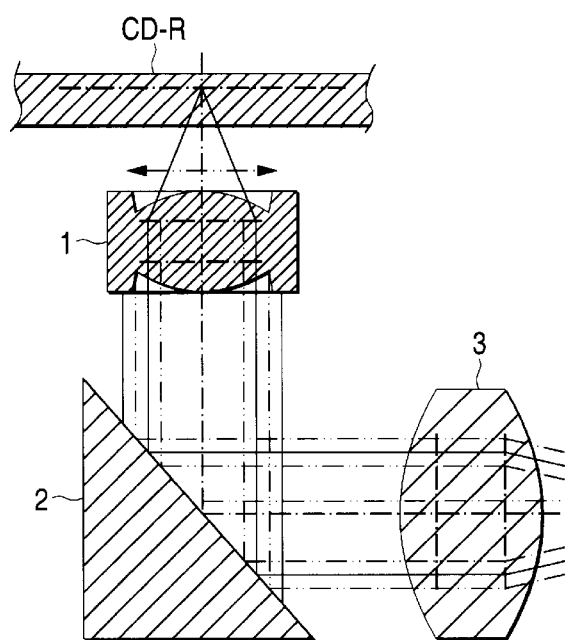
FIG. 4(a) is an explanatory view showing the configuration of a light-receiving system of an optical pickup.
FIG. 4(b) is a front view of a photosensor.
Figure 4:
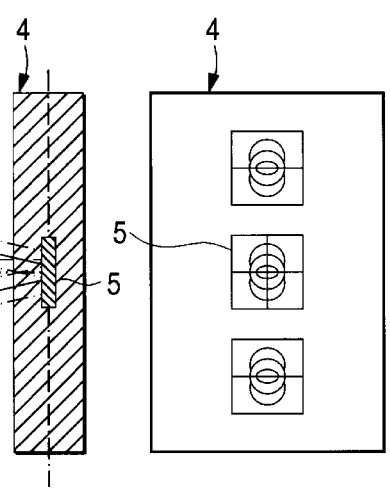

FIG. 2 shows a wobble signal extraction system. The light-receiving portions C1, C2, C3 and C4, as four splits, of the main-beam photodiode 5 are connected to inverting amplifiers Amp1 to Amp4 respectively. The sum of the output of the amplifier Amp1 and the output of the amplifier Amp4 is inputted to an inverting amplifier Amp5 whereas the sum of the output of the amplifier Amp2 and the output of the amplifier Amp3 is inputted to an inverting amplifier Amp6. Signals (C1+C4) and (C2+C3) from the amplifiers Amp5 and Amp6 respectively are inputted to a wobble signal arithmetic operation portion 16 of the screw processor 8.

The wobble signal arithmetic operation portion 16 is configured so that the input signals are subjected to an arithmetic operation based on the following expression:

(C1+C4)/α*(C1+C4)−(C2+C3)/α*(C2+C3)

in which α is a constant.

That is, outputs from the inner half and outer half portions of the main-beam photodiode 5 are normalized, and then subtraction is executed between the normalized values. Accordingly, even in the case where the objective lens 1 is shifted inward or outward as shown in FIGS. 5(a), 5(b) and 5(c), a stable wobble signal can be extracted because the arithmetic result in the on-track main laser beam MB is always zero so that the DC offset components of the difference signals are cancelled out.

It is a matter of course that the present invention is not limited to the aforementioned embodiment but various changes may be made within a technical scope of the present invention so that the present invention includes the changes.

As described above, in the method for generating a wobble signal in a CD-R drive according to the present invention, the wobble signal can be extracted securely regardless of the relative positional deviations of the objective lens and the photosensor in the optical pickup. Accordingly, the worsening of the wobble signal at the time of track crossing or just after the crossing is reduced so that the tracking servo performance is improved.

Further, in the same manner as described above, the bad influence of the positional displacement of the photosensor of the optical pickup in the track crossing direction on the wobble signal can be eliminated so that an effect is fulfilled for stabilizing the performance of the CD-R drive.

What is claimed is:

1. A method for generating a wobble signal in a CD-R drive comprising the steps of:

receiving reflected light of wobble pits dug in a CD-R disk by means of a main-beam photodiode of an optical pickup;

normalizing respective outputs from inner half and outer half light-receiving surfaces of said main-beam photodiode; and subtracting one of the respective outputs from the other output to thereby extract a wobble signal, said normalizing and subtracting being performed according to the arithmetic operation:

$$(C1+C4)/\alpha*(C1+C4)-(C2+C3)/\alpha*(C2+C3)$$

where $\alpha$ is a constant, wherein said optical pickup includes four light receiving portions $C1$, $C2$, $C3$ and $C4$, where $C1$ and $C4$ receive output from said inner half light receiving light surface of said main beam photodiode, and where $C2$ and $C3$ receive output from said outer half light receiving surface of said main-beam photodiode.

* * * * *